United States Patent [19]

Guillermier

[11] 3,996,823
[45] Dec. 14, 1976

[54] METHOD FOR DRILLING AND TOOL CARRIER FOR BRINGING SUCH A METHOD INTO EFFECT

[76] Inventor: Bernard Guillermier, Batiment Radar, Route de Vignieres, 74000 le Vieux, France

[22] Filed: Dec. 11, 1974

[21] Appl. No.: 531,505

[30] Foreign Application Priority Data

Dec. 11, 1973 France .................. 73.44190

[52] U.S. Cl. .................. 82/1 C; 10/129 R; 74/22 A; 82/34 R; 82/DIG. 9; 408/17
[51] Int. Cl.² .................. B23B 29/04; B23B 27/22; B23B 43/02
[58] Field of Search .......... 82/1 C, 31, 34 R, 36 R, 82/DIG. 9; 408/17; 10/129 R; 175/189; 74/22 A

[56] References Cited
UNITED STATES PATENTS

| | | | |
|---|---|---|---|
| 2,581,258 | 1/1952 | Karweit | 408/17 |
| 3,303,522 | 2/1967 | Kumabe et al. | 408/17 |
| 3,579,688 | 5/1971 | Keltz et al. | 10/129 R X |

*Primary Examiner*—Leonidas Vlachos
*Assistant Examiner*—Z. R. Bilinsky
*Attorney, Agent, or Firm*—Sughrue, Rothwell, Mion, Zinn & Macpeak

[57] ABSTRACT

Method for drilling a metal part driven in a rotating movement about the axis $xx'$. The drill is brought, besides the advancing movement along the axis $xx'$ by a longitudinal alternating movement along the axis $xx'$ and by a pivoting alternating movement about the axis $xx'$. The shavings thus formed break and are easily removed, this increasing the drilling speed. Tool-carrier for bringing the method into effect comprises a piston sliding and pivoting in a sleeve. The piston is provided with a holder bearing the drill and comprises a cavity inside which an eccentric rotates.

6 Claims, 8 Drawing Figures

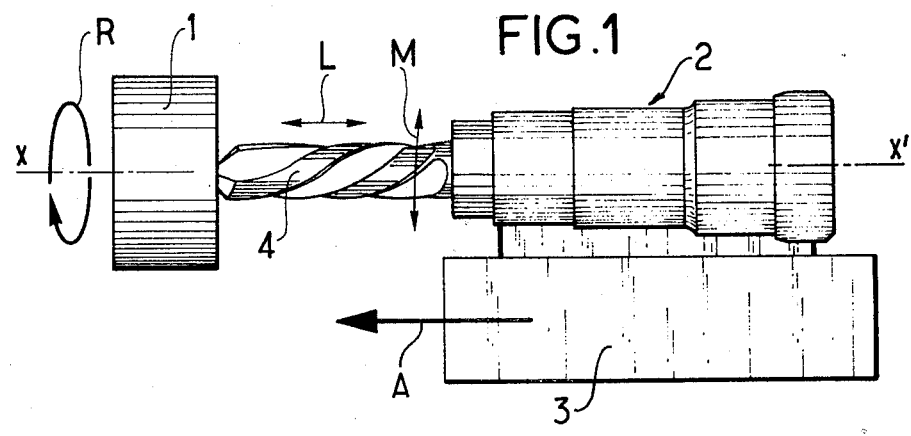
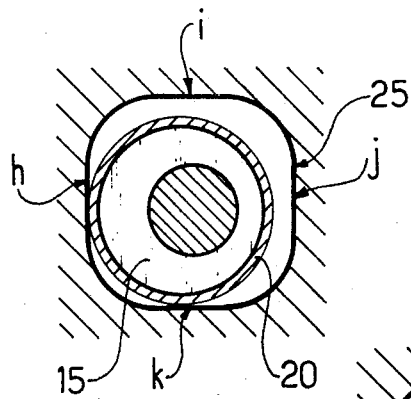
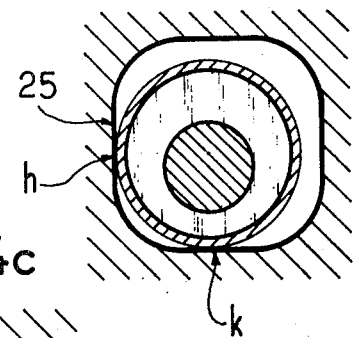
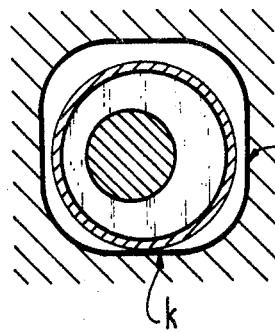
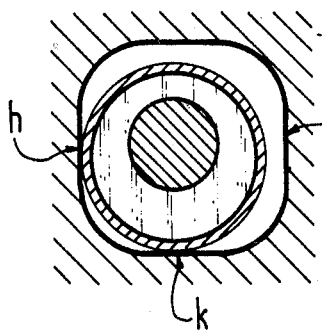
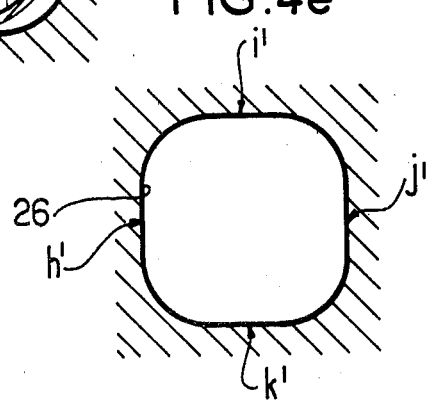

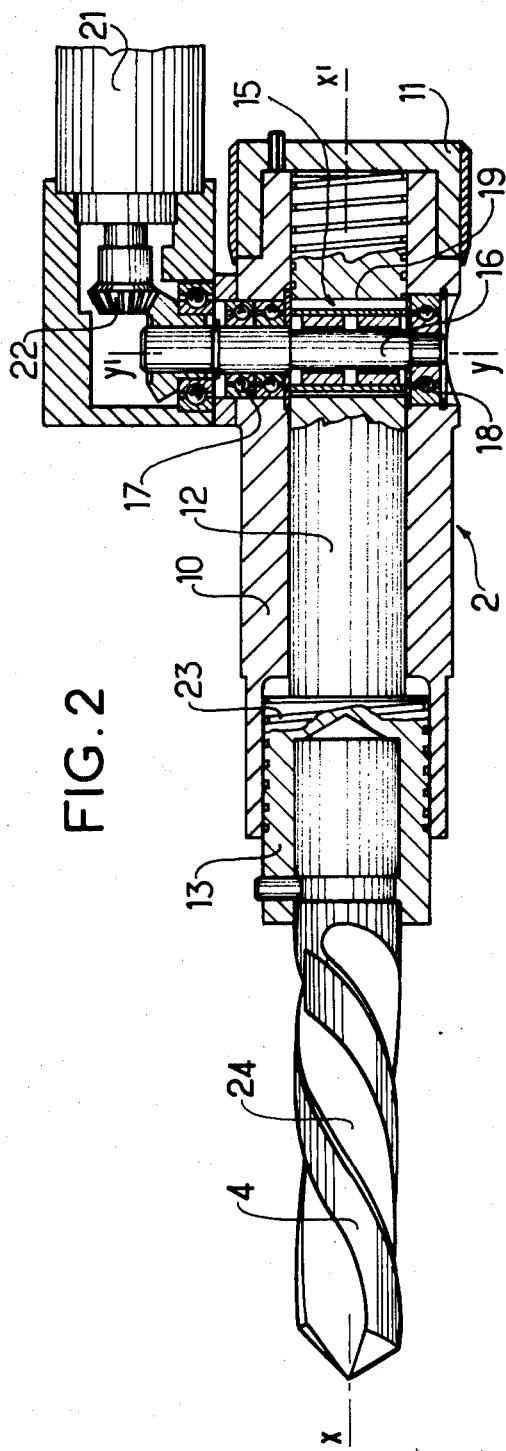
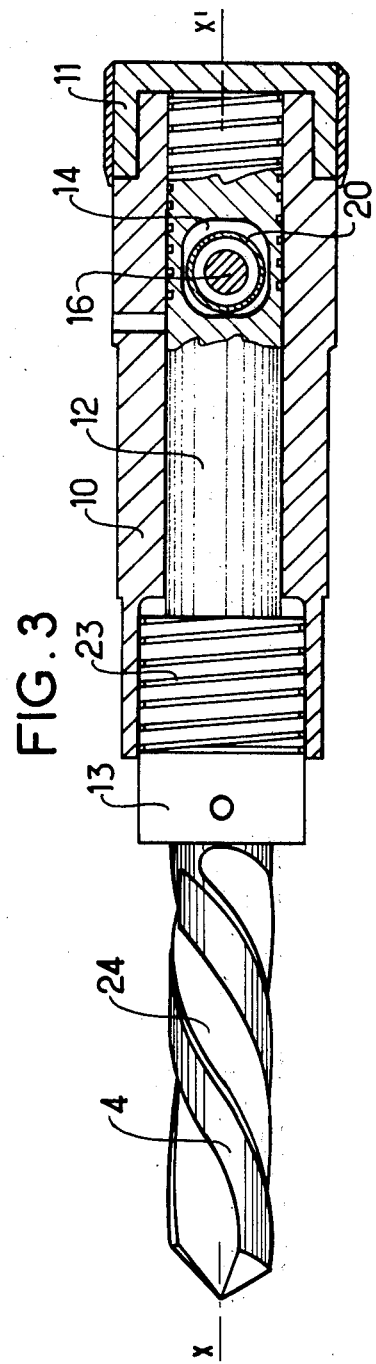

METHOD FOR DRILLING AND TOOL CARRIER FOR BRINGING SUCH A METHOD INTO EFFECT

BACKGROUND OF THE INVENTION

1. Field of the Invention

The present invention relates to a method for drilling a part driven in a rotating movement about an axis enabling the dividing up and removal of shavings and to the tool carrier enabling the bringing into effect of such a method.

2. Description of the Prior Art

It is known that there are methods for drilling a metallic part driven in a rotating movement about an axis $xx'$ enabling the dividing up of the shavings produced during the drilling and consisting in interrupting the advancing movement along the axis $xx'$ of the drill driven in a rotating movement about that axis. The drill is removed completely from the hole already drilled. The shaving which is formed during the drilling is broken at each removal of the drill, since the latter no longer bites into the metal.

In order to improve the drilling speed, which is relatively slight because of the successive withdrawals of the drill, it is a known method to use a process for drilling a part with a drill, according to which the part to be drilled is driven in a rotating movement about an axis $xx'$, whereas the drill is driven in 3 movements, a first movement which is an advancing movement along the said axis $xx'$, a second movement which is a longitudinal alternating movement along the axis $xx'$, having a period T and slight amplitude in relation to the depth of the hole to be drilled, a third movement which is a rotating movement about the axis $xx'$.

The frequency of the longitudinal alternating movement is chosen such that the advancing of the drill be interrupted and that the drill no longer biting into the metal, the shaving breaks.

Now, there are difficulties for removing the shaving thus broken from the fillets of the drill, so that there is a danger of blocking the shavings which are formed at the bottom of the hole being drilled, all the more so as the lubricant which should reach the point of the tool along the fillets flows only partly.

SUMMARY OF THE INVENTION

The drilling method according to the invention enabling the removal of the broken shavings from the fillets of the drill and thus ensuring proper lubrication of the point of the tool and an easier evacuation of the shavings is a process for drilling a part with a drill according to which the part to be drilled is driven in a rotating movement about an axis $xx'$ whereas the drill is driven in 3 movements, a first movement which is an advancing movement along the said axis $xx'$, a second movement which is a longitudinal alternating movement along the axis $xx'$, having a period T and slight amplitude in relation to the depth of the hole to be drilled, a third movement which is a rotating movement about the axis $xx'$, characterized in that the said third movement is alternating with a period T and a rotating angle equal to a fraction of a right-angle.

The alternating rotating movement provides for the desengaging of the shaving from the fillets of the drill, this making its evacuation by the lubricant very much easier.

The tool-carrier enabling the bringing into effect of the method according to the invention is a tool-carrier which may be installed on the carriage of a machine tool in which the part to be drilled is driven in a rotating movement about an axis $xx'$, the said carriage being mobile parallel to the axis $xx'$, characterized in that it comprises:

A sleeve inside which slides and pivots a cylindrical piston whose axis is $xx'$ provided at one end with a holder in which a drill may be fitted;

An eccentric rotating inside a cylindrical cavity formed in the piston whose generating lines are orthogonal to the axis $xx'$;

Means for driving the eccentric in a rotating movement about an axis $yy'$ perpendicular to the axis $xx'$.

The drill in the tool-carrier according to the invention not being driven in a continuous rotating movement, little power is needed to move that drill in a longitudinal alternating movement having slight amplitude and in an alternating rotating movement having a small angle. It is thus possible to use, as a means for driving the eccentric in a rotating movement, a low-power motor mounted on the sleeve of the tool-carrier.

In the tool-carrier according to the invention, the drill is not driven as in conventional devices in a continuous rotating movement and it is possible to adjust the period T of the alternating movements and the rotating speed of the part to be machined in a totally independent way. This has an advantage in relation to conventional devices in which, when the advancing is increased, it is necessary to increase the frequency of the longitudinal alternating movement (for the speed of the linear movement of the drill to be cancelled out) and hence the continuous rotating speed of the drill, this making compulsory the reducing of the rotating speed of the part. This is then detrimental to the other functions of the machine-tool.

The following description with reference to the accompanying figures will make it easier to understand how the invention may be brought into effect.

BRIEF DESCRIPTION OF THE DRAWINGS

FIG. 1 shows diagrammatically the tool-carrier according to the invention mounted on the carriage of a machine-tool;

FIG. 2 is a vertical cutaway view passing through the axis $xx'$ of the tool-carrier according to the invention;

FIG. 3 is a horizontal cutaway view passing through the axis $xx'$ of the tool-carrier according to the invention;

FIG. 4a to 4e illustrate the positions of the eccentric of the tool-carrier.

DESCRIPTION OF THE PREFERRED EMBODIMENT

FIG. 1 shows diagrammatically the tool-carrier according to the invention mounted on the carriage of a machine-tool.

The part 1 to be machined is driven in a rotating movement about an axis $xx'$ which, it will be assumed, to make the description easier, is horizontal and the tool-carrier 2 according to the invention is mounted on a carriage 3 which can be moved parallel to $xx'$. The tool-carrier 2 bears a drill 4 whose axis merges with $xx'$.

The movement of the part 1 to be drilled, along the axis $xx'$, is a rotating movement R is a certain direction and at a certain speed.

The movement of the drill 4 can be decomposed into 3 movements:

A continuous advancing movement A along the axis $xx'$;

A longitudinal alternating movement L along the axis $xx'$, having slight amplitude in relation to the depth of the hole to be drilled and having a period T;

An alternating rotating movement M about the axis $xx'$, having a small angle of rotation and a period T.

When the drill 4 bites into the part 1, the latter tends to make it rotate with it in the same direction and to push it backwards.

The tool-carrier according to the invention is illustrated in more detail in FIG. 2, showing the vertical cutaway view passing through $xx'$ and in FIG. 3, showing the horizontal cutaway view passing through $xx'$.

The tool-carrier 2 comprises a cylindrical sleeve 10 whose axis is $xx'$ closed at one end by an adjustable stop in the position 11 and open at the other end. A piston 12, whose axis is also $xx'$, which may slide and pivot freely inside the sleeve 10, is arranged inside the sleeve 10.

The piston 12 ends, on the opposite side to the stop 11, in a holder 13 intended for having the drill 4 fitted into it.

A cylindrical cavity 14 having a vertical axis of symmetry is formed in the piston 12, in the opposite part to the holder 13. The cross-section of the cavity 14 is illustrated in FIG. 3; it has approximately the shape of a square whose right-angled corners have been rounded.

The tool-carrier comprises an eccentric 15 crossing through the cavity 14. The eccentric comprises a shaft 16 whose ends are mounted on pivots 17, 18 fast with the sleeve 10 and whose vertical axis $yy'$ is perpendicular to $xx'$ and parallel to the generating lines 19 of the cylindrical cavity 14.

The eccentric 15 also comprises a cylindrical ring 20 whose vertical axis is different from $yy'$. A motor 21 mounted on the sleeve 10 drives the eccentric 15 in a rotating movement by means of a gearing system 22. The piston is provided with a helical groove 23 through which the lubricant passes inside the sleeve.

When the eccentric 15 rotates, the ring comes into contact with the top edge 25 and the bottom edge 26 of the cavity 14, as will be explained with reference to FIGS. 4a to 4e in which the top edge 25 with its four sides $h, i, j, k$, has been shown. It will be assumed that the part to be machined seen from the drill rotates in a clockwise direction. When the drill comes into contact with the part, it also tends to rotate in a clockwise direction and is pushed backwards so that the sides $h$ and $k$ of the top edge 25 of the cavity 14 are in contact with the ring 20 of the eccentric 15. When the eccentric 15 rotates, assuming that the eccentric rotates in a clockwise direction, the ring 20 pushes the edge $h$ forwards and the drill penetrates into the part (FIG. 4a).

The pressure exerted by the drill on the part keeps the side $h$ in contact with the ring 20 and the side $h$ follows the eccentric and hence starts up a backward movement. The side $k$ continues to exert a pressure on the eccentric 15 so that the piston and the drill pivot in a clockwise direction (FIG. 4b).

The eccentric continues to rotate and the front side $h$ of the top edge 25 as well as the front side $h'$ of the bottom edge 26a are no longer in contact with the ring 20, for the piston 12 comes into contact with the stop 11 (FIG. 4c).

When the eccentric 15 continues to rotate, the ring 20 pushes the side $k$ of the upper edge 25 back and makes the piston 12 pivot in an anticlockwise direction (FIG. 4d).

The ring 20 also comes symmetrically into contact with the bottom edge 26 of the cavity 14, which comprises 4 sides $h', i', j', k'$ (FIG. 4e). Because of the torsional couple between the drill and the part, the ring 20 remains in contact with $k$ and $i'$, and contacts at the same time $h$ and $h'$.

It will be seen therefore that the rotation period T of the motor determines the period of the longitudinal alternating movement L whose amplitude may be adjusted by changing the position of the stop and the period of the alternating rotation movement M whose angle at the center depends on the respective dimensions of the eccentric 15 and of the cavity 14. That angle in the center may be chosen in the order of 1 to 5.

The rotation speed of the motor should be adjusted so that the speed of the drill at the time of the longitudinal alternating movement be at least equal to the speed of advance A so that the sum of the two speeds of linear movement of the drill along the axis $xx'$ may cancel out or become negative, so that the shaving formed breaks.

The rotating alternating movement M enables the detaching of the broken shaving from the fillets 24 and the shaving is then removed through the fillets 24 by the lubricant.

Although the tool-carrier which has just been described may appear to afford the greatest advantages for the bringing into effect of the invention, it will be understood that various modifications may be made thereto without going beyond the scope of the invention, it being possible to replace certain of their elements by other elements capable of fulfilling the same technical function or an equivalent technical function therein.

I claim:

1. In a method for drilling a part with a drill including the steps of rotating the part to be drilled about an axis $xx'$ and driving the drill in three movements; a first movement which is an advancing movement along said axis $xx'$, a second movement which is a longitudinal alternating movement along the axis $xx'$, having a period T and slight amplitude in relation to the depth of the hole to be drilled, and a third movement which is a rotating movement about the axis $xx'$; the improvement wherein: said third movement is alternating with a period T and a rotating angle equal to a fraction of a right-angle.

2. The method as claimed in claim 1, wherein the speed of said second movement is at least equal to the speed of said first movement so as to cancel out said first movement or cause said first movement to become negative so as to form breaks in the shaving of said part being drilled.

3. In tool-carrier which may be installed on the carriage of a machine tool in which the part to be drilled is driven in a rotating movement about an axis $xx'$, and said carriage is mobile parallel to the axis $xx'$, the improvement wherein said tool-carrier comprises:

a sleeve, a cylindrical piston slidable and pivotable within said sleeve, said piston having an axis coinciding with axis $xx'$, and being provided at one end with a holder in which a drill may be fitted;

means for advancing said drill towards said part along said axis $xx'$;

an eccentric rotating inside a cylindrical cavity formed in the piston, said cavity having opposed pairs of walls at right angles to the axis of rotation of said eccentric, said opposed pairs of walls being spaced apart in excess of the diameter of said eccentric; and means for driving the eccentric in a rotating movement about an axis $yy'$ perpendicular to the axis $xx'$ such that during rotation of said eccentric said piston is provided with a longitudinal alternating movement along the axis $xx'$ superimposed upon the advancing movement of said piston which is of slight amplitude in relation to the depth of the hole to be drilled and said eccentric further provides an alternating rotating movement of said piston about the axis $xx'$ having a rotating angle equal to a fraction of a right angle.

4. A tool-carrier according to claim 3, wherein: the sleeve (10) is provided with an axially adjustable position stop (11) which interrupts the back stroke of the piston (12).

5. A tool-carrier according to claim 3, wherein: the means (21, 22) for driving the eccentric (15) in a rotating movement comprises a motor (21) mounted on the sleeve (10).

6. A tool-carrier according to claim 4, wherein: means (21, 22) for driving the eccentric (15) in a rotating movement comprise a motor 21 mounted on the sleeve (10).

* * * * *